United States Patent [19]

Marui

[11] Patent Number: 4,803,717
[45] Date of Patent: Feb. 7, 1989

[54] AUTOMATIC ANSWERING TELEPHONE WITH MEMORY STORAGE HAVING STORAGE INDICATION AND AN ALARM

[75] Inventor: Kuniyoshi Marui, Tokorozawa, Japan

[73] Assignee: Kabushiki Kaisha Toshiba, Tokyo, Japan

[21] Appl. No.: 757,868

[22] Filed: Jul. 23, 1985

[30] Foreign Application Priority Data

Jul. 30, 1984 [JP] Japan .................................. 59-157232

[51] Int. Cl.$^4$ ............................................ H04M 1/65
[52] U.S. Cl. ....................................... 379/67; 379/142; 379/372
[58] Field of Search ................... 179/2 DP, 2 E, 2 A, 179/2 EA, 5.5, 81 R, 90 B, 90 BB, 90 BD, 84 VF, 84 L, 84 C, 6.04, 6.07, 6.11, 18 B; 379/88, 89, 69, 372, 67, 142

[56] References Cited

U.S. PATENT DOCUMENTS

| | | | |
|---|---|---|---|
| 4,399,331 | 8/1983 | Brow et al. | 179/6.04 |
| 4,443,664 | 4/1984 | Gange | 179/5.5 |
| 4,600,809 | 7/1986 | Tatsumi et al. | 379/88 |
| 4,616,110 | 10/1986 | Hashimoto | 379/88 |

FOREIGN PATENT DOCUMENTS

60-10861  1/1985  Japan .................................. 379/88

Primary Examiner—James L. Dwyer
Attorney, Agent, or Firm—Banner, Birch, McKie & Beckett

[57] ABSTRACT

The present invention is directed to a method and system which is automatically responsive to transmitted DTMF signals containing messages received from, and corresponding to respective calling originators. The invention provides an indication to the user of message storages areas which are used or available. If all message storages are full, an alarm function is provided. The system also provides an automatic dial capability wherein the number dialed is retained in memory only if the call is not completed.

26 Claims, 9 Drawing Sheets

AUTOMATIC ANSWERING TELEPHONE WITH MEMORY STORAGE HAVING STORAGE INDICATION AND AN ALARM

BACKGROUND OF THE INVENTION

1. Field of the Invention

This invention relates to a receiver telephone having an automatic response capability. That is, when a receiving party is absent, a voice reply is automatically sent to the calling originator. The term absent as used herein means that the receiving party is either not present to answer his telephone or is otherwise unwilling or unavailable to answer the telephone. In particular, the receiver telephone will store a predetermined message sent by the calling originator and/or the originator's telephone number in response to a dual tone multifrequency (DTMF) signal also sent by the calling originator.

2. Description of the Prior Art

Various types of automatic telephone answering devices have been used in the prior art with the capability of sending an automatic voice reply to the calling originator when the receiving party is absent. Basically, if a call signal arrives at the telephone of an absent party, such telephone answering devices are designed to send a message to the calling originator indicating that the receiving party is absent and then to record a message from the calling originator. Upon returning, the party listens to the recorded message in order to determine who had telephoned him while he was absent.

In the prior art systems described above, the recorded message was made by recording the voice of the calling originator on a recording medium such as a magnetic tape. Such a system, however, is too large and bulky since voice signals, having an indefinite quality of information, are recorded, and since it is necessary to use a recording device incorporating magnetic tape or the like. At present, it is not possible to utilize a compact and suitable voice recording device.

In recent years, there has been an increasing demand for portable telephone sets, such as automobile and cordless telephones. There is a need that these wireless telephones also have an automatic response capability for automatically recording the message from the calling originator. It is not possible, however, to use prior art answering devices with a wireless telephone due to its size and handling inconvenience.

One technique for overcoming the problem is disclosed in the commonly assigned U.S. patent application Ser. No. 613,646 filed May 24, 1984, which is incorporated herein by reference. That application incorporates computer control technique and associated read-only and random-access memories to overcome the size and handling problems discussed above.

Briefly stated, according to that application, instead of directly recording a voice signal from a remote party, a message from the remote location is transmitted by depressing a key (e.g., a push button) to the telephone apparatus of the receiving or called party. In particular, in response to depressing the key, a DTMF signal corresponding to a particular message is transmitted to the receiving party. Upon decoding the DTMF signal, it is stored in a memory device of the receiving party's telephone device. The term DTMF signal comprises a combination of two voice frequency signals generated for the purpose of identifying the particular depressed keys of the remote telephone apparatus. The term message from the remote party means the telephone number of the calling originator and/or other predetermined message sent by the calling originator. That is, predetermined messages can be generated by depressing respective keys of the telephone apparatus (e.g., "please telephone me" or "I will telephone again").

SUMMARY OF THE INVENTION

This instant invention is an improvement over the system disclosed in U.S. application Ser. No. 613,646. In particular, that system has a limited memory for storing messages or other information regarding the characteristic of the calling originator (e.g. telephone number). Once the memory is filled, additional messages which are received will be lost. There is no indication provided to the user of the storage areas which are used or available. The present invention overcomes this problem by continuously displaying the number of vacant storage areas which are available. Consequently, in response to the displayed information a party can listen to his messages in order to clear more storage area for receiving additional incoming messages.

Second, the system disclosed in that application does not provide any indication when the storage areas are full; as a result, subsequent incoming messages will be lost. The present invention overcomes this problem by providing an alarm capability to notify the user of this condition. Finally, the prior system permits an automatic dial capability whereby the party, upon his return, can automatically dial the telephone number previously stored. This number, however, remains stored in memory even if the call is completed to the calling originator; it cannot be erased unless the party specifically erases that number from memory. The instant invention, however, retains the number in memory if, and only if, the call is not completed (i.e., speaking path is not established). If, however, the call is completed, that number will automatically be erased from memory.

It is an object of this invention to provide a novel telephone system capable of recording a message from a calling originator, while having a small compact size and being convenient for carrying by an individual or installation in a limited space.

It is another object of the invention to improve the operational features of existing portable telephones with automatic response capability.

It is a further object of the invention to display the number of vacant memory areas which are available to store additional incoming messages.

It is still a further object of the invention to provide an alarm capability in the event the memory areas are full to avoid the loss of subsequently received messages.

It is a still further object of the invention to permit automatic cancellation of a number stored in memory if a return call is made by a party and the call is completed.

According to this invention, a receiver telephone comprises: a DTMF signal decoder for decoding a DTMF signal sent from the calling party in response to depressing a key by the calling party after a speaking path has been established; a memory having fixed storage areas for storing messages corresponding to the output of the DTMF signal decoder; and, a control means for searching vacant storage areas within the memory and for storing messages in said vacant areas.

The receiver telephone of this invention may be designed with integrated circuits to miniaturize the telephone system and to decrease its manufacturing cost. Moreover, there are no space limitations for installing the receiver since the telephone apparatus is small and compact. Further, the receiver telephone of this invention can be operated by batteries; therefore, it can easily be used in a portable environment, such as in an automobile or as a cordless telephone. Since this invention is primarily constructed of electrically operating circuit elements rather than mechanical elements, its useful life can be increased. Instead of directly storing voice messages from a calling originator, the message is stored by utilizing DTMF signals; as a result, the size of the memory can be reduced while permitting automatic call capability by utilizing information stored in the memory device. Moreover, the memory can contain discrete pre-recorded fixed messages which will be communicated to the calling party if the called party is absent.

DETAILED DESCRIPTION OF THE PREFERRED EMBODIMENTS

Figure 1:
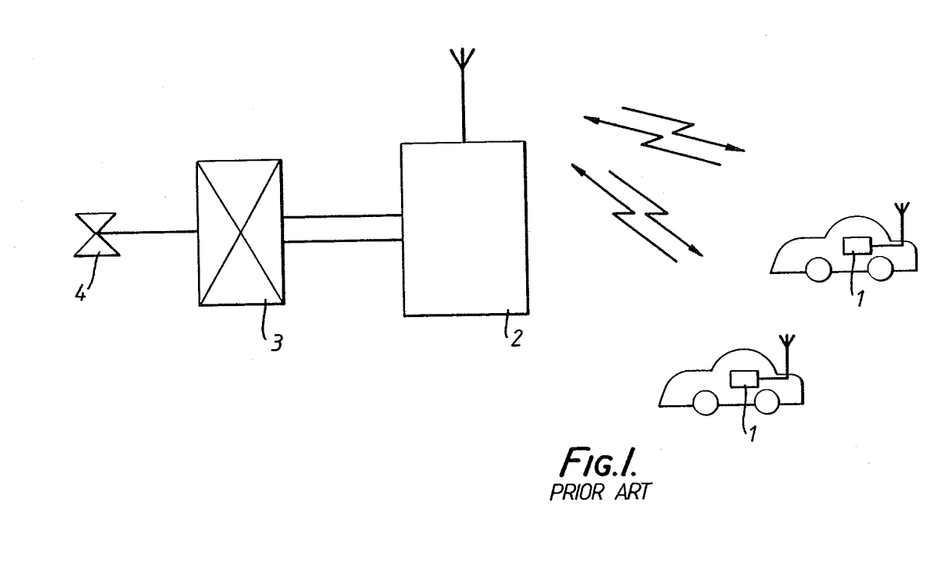
FIG. 1 is a block diagram of the major features of a conventional wireless telephone system.

A conventional wireless telephone system, such as the one shown in FIG. 1, includes a wireless telephone apparatus 1 for communicating by radio signals with base station 2. Base station 2 is connected by land lines to telephone exchange 3. This system is capable of connecting telephone calls between two wireless or remote telephones 1 or a wireless telephone 1 and regular stationary telephone 4. A plurality of frequency channels are used for communicating between wireless telephone 1 and base station 2; at least one channel is allocated to a control function and the remaining channels are allocated to operational functions, (i.e., telephone conversations). A telephone conversation is established on an available operating channel by initiating communication on the control channel and exchanging control information, and then switching to the operating channel.

Figure 2:
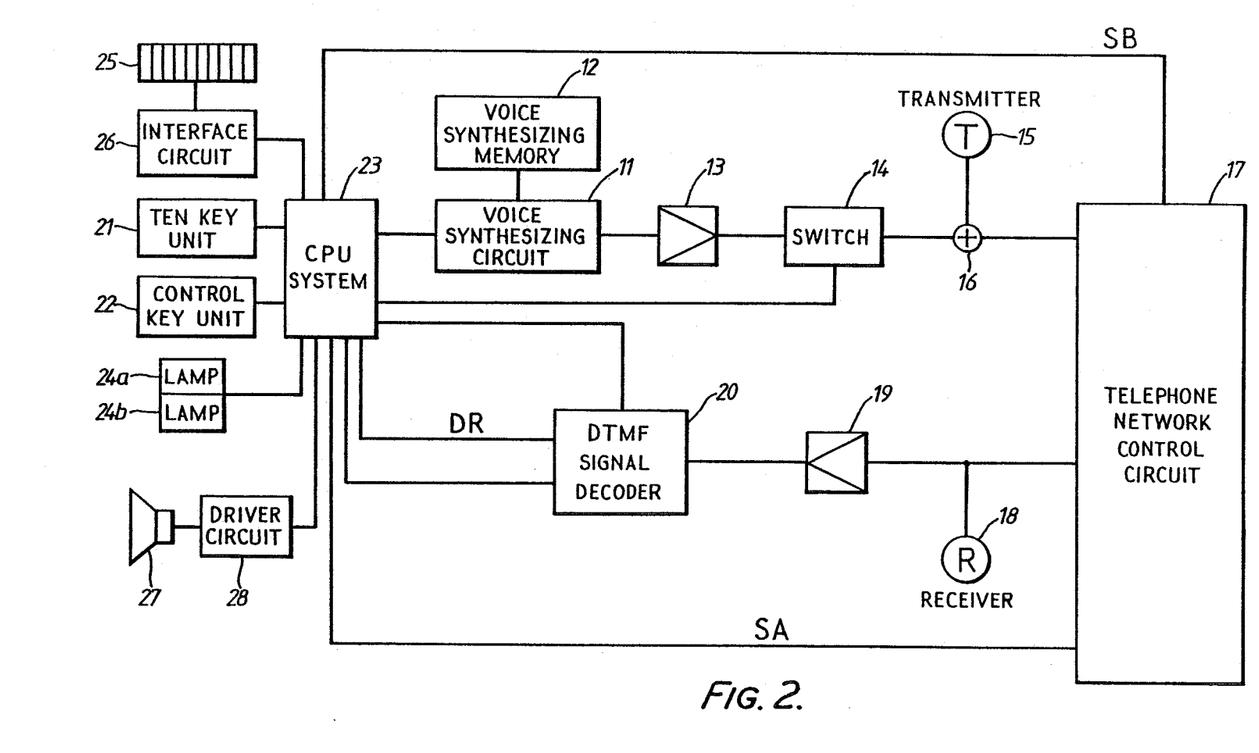
FIG. 2 is a block diagram showing one embodiment of the wireless telephone apparatus according to the instant invention.

A wireless telephone apparatus according to the present invention is shown in FIG. 2. This telephone apparatus comprises: a voice synthesizing circuit 11; a voice synthesizing memory 12; an amplifier 13 for amplifying a voice signal supplied from voice synthesizing circuit 11; a switch 14 for supplying the voice signal to the output of a transmitter 15 in response to a calling originator; a mixer 16 for synthesizing the output signal of transmitter 15 and the output signal of switch 14; and a telephone network control circuit 17 that controls establishing a radio speaking channel for communicating with a remote telephone apparatus (i.e., calling originator).

The system further comprises: a receiver 18 for receiving a DTMF signal sent by a calling party; an amplifier 19 for amplifying a DTMF signal sent by the calling party; a DTMF signal decoder 20 for decoding the telephone number sent by the calling party in the form of DTMF signal; a ten key unit 21 which outputs a dial number; a control key unit 22 for controlling an automatic response capability; a CPU system 23 including memory elements which stores the receiving unit's telephone number supplied by the ten key unit 21 or the telephone number supplied by the DTMF signal decoder 20.

CPU system 23 supplies to the voice synthesizing circuit 11 the receiving unit's telephone number or the caller's telephone number together with a predetermined message stored in voice synthesizing memory 12. In response, voice synthesizing circuit 11 synthesizes a voice signal corresponding to this information when a call signal is transmitted from base station 2 by the calling originator. A lamp 24a displays if an absent mode has been set; lamp 24b displays if the telephone number of the calling party has been stored. A number display 25 displays the telephone number of the calling party; number display 25 is controlled by interface circuit 26.

Figure 3:
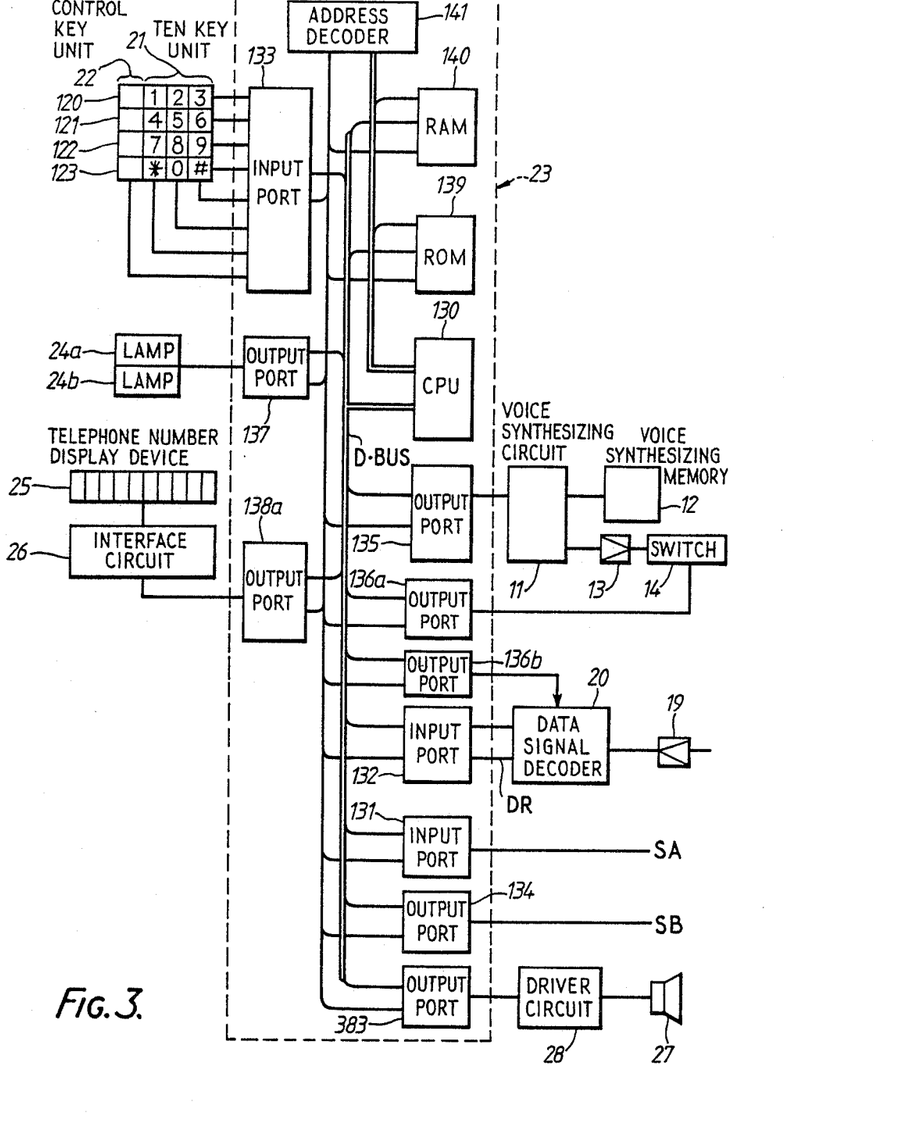
FIG. 3 is a block diagram showing a CPU system utilized in the apparatus of FIG. 2.

FIG. 3 is a block diagram showing the detail of CPU system 23 and its peripheral apparatus. CPU system 23 comprises: three input ports 131–133; seven output ports 134, 135, 136a, 136b, 137, 138a and 138b; a ROM 139 storing a control program; a RAM 140 storing the receiving unit's telephone number and the caller's telephone number; an address decoder 141 for selecting one of the output ports; and a central processing unit (CPU) 130. The ten key unit 21 is provided with: digit keys of digits 0–9; an asterick key *; and a number key #. Control key unit 22 is provided with a message key 120; a send key 121; a regeneration key 122; and a clear key 123. The ON-OFF signals produced by these keys are sent via input port 133 to a data bus line D.BUS of CPU 130.

The operation of the wireless telephone apparatus according to the invention will be described with reference to the flow charts shown in FIGS. 4–8.

Figure 4:
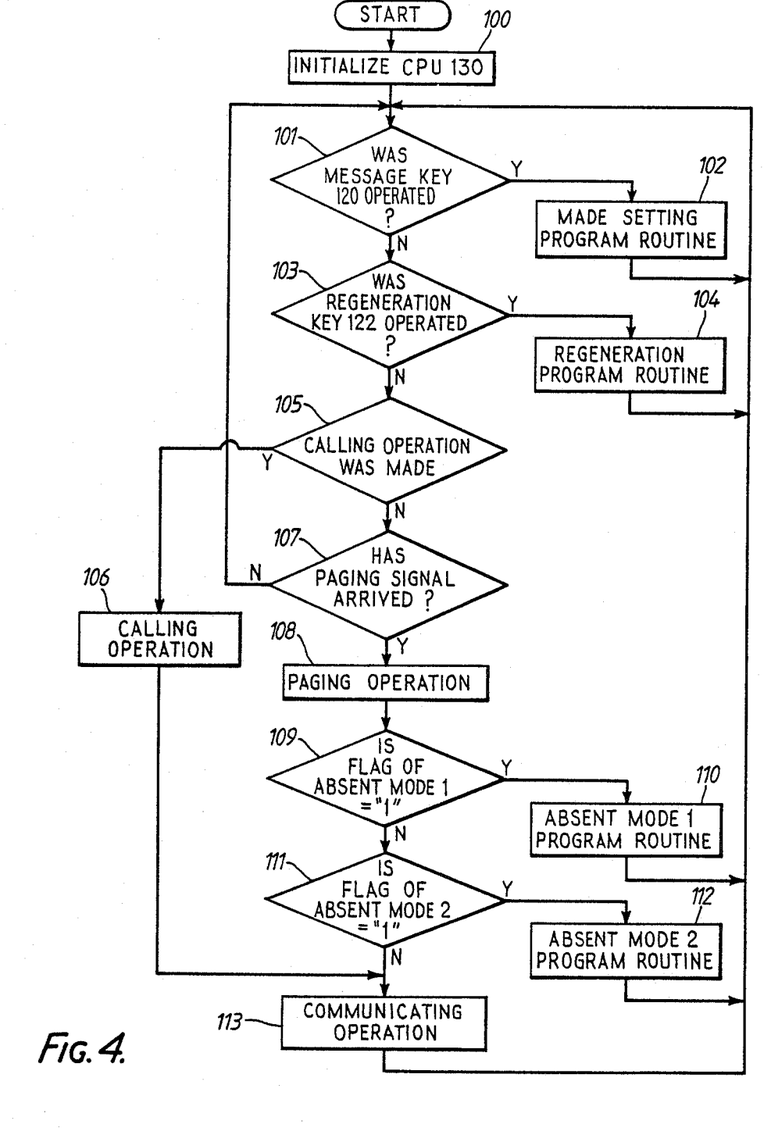
FIGS. 4 through 9 are flow charts showing the operations of the CPU of FIG. 3.

Immediately after closing a source switch (not shown), CPU 130 is initialized at step 100 (FIG. 4). At step 101, a check is made whether message key 120 was activated. Message key 120 is provided for the purpose of utilizing the automatic response capability of the system. Accordingly, when message key 120 is activated, CPU 130 executes the mode setting program routine of step 102; after which CPU 130 again executes step 101. If message key 120 is not operated (step 103), a check is made whether the regeneraton key 122 was activated. Regeneration key 122 is provided for the purpose of reading the decoded data stored in a region of RAM 140. Accordingly, when regeneration key 122 is operated, CPU 130 executes the regeneration program routine of step 104; afterwhich, CPU 130 again executes step 101. If, however, message key 120 and regeneration key 122 are not operated (step 105), a check is made whether the calling operation (hook-off operation or send key operation) was made, and a check is made (step 107) whether the paging signal AS was received through the telephone network circuit 17. If the results of checks at steps 105 and 107 are "no", the program returns to step 101.

If the calling operation was made (step 106), a communicating operation is then made (step 113). If the paging signal was received due to the calling operation by the caller, CPU 130 sends a control signal SB to the telephone network control circuit 17 to establish a speaking path to the caller's telephone (step 108). At step 109, the CPU 130 detects whether a flag of the absent mode 1 is "1" or "0". If the setting flag of the absent mode 1 is "1", CPU 130 determines whether the setting flag of the absent mode 2 is "1", or "0" (at step 111). If the setting flag of the absent mode 2 is 1, CPU 30 executes the absent mode 2 program (step 112); thereafter, the program returns to step 101. If the setting flag of the absent mode 1 and absent mode 2 are "0", CPU 130 performs a communicating operation (step 113); the program then returns to step 101.

Figure 5:
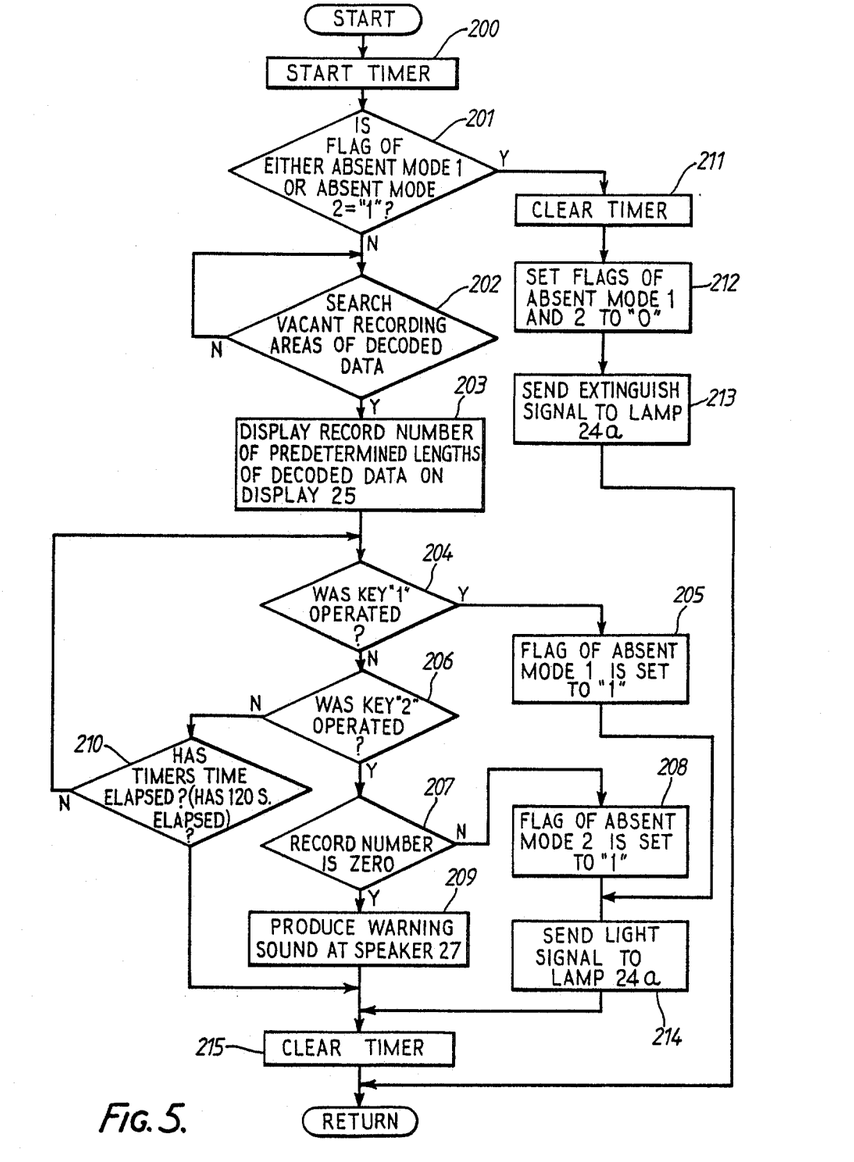

Referring to FIG. 5, the mode setting program at step 102 will be discussed. When the message key 120 is operated (step 200), CPU 130 starts its own timer (not shown). CPU 130 then determines whether the setting flag of absent mode 1 or absent mode 2 are "1" or "0" (step 201). If a setting flag of the absent mode 1 or absent mode 2 is "1", CPU 130 clears its timer (step 211). Then CPU 130 sets the state of the setting flag of absent mode 1 and absent mode 2 to "0" (step 212) and sends data to output port 137 for turning off lamp 24a (step 213).

If the flag of absent mode 1 and absent mode 2 are "0", CPU 130 searches a predetermined recording areas of the decoded data in RAM 140 (step 202). CPU 130 then detects the vacant recording areas and determines a record number which represents the number of predetermined length's of decoded data which will be stored in the vacant recording areas. CPU 130 stores the record number data in its buffer register and transmits it to an interface circuit 26 through an output port 138a. (step 203). Interface circuit 26 supplies a display device 25 with signals according to the transmitted data, whereby the record number is displayed on display device 25.

At steps 204 and 206 a determination is made whether key 1 or 2 of ten key unit 21 was activated. If key 1 is operated, CPU 130 sets the setting flag of absent mode 1 to "1" (step 205). A signal is then sent to lamp 24a through output port 137 to light lamp 24a (step 214). Then, CPU 130 clears its timer (step 215) and returns to again execute step 101. If key 2 is operated CPU 130 reads out the record number data from its own buffer register. If the record number data isn't zero, CPU 130 sets the flag of absent mode 2 to "1" (steps 207, 208). CPU 130 then sends a signal to light lamp 24a (step 214); the timer is cleared (step 215) and the CPU returns to again step 101. If the record number data is zero, CPU 130 determines that RAM 140 doesn't have any vacant recording areas within its predetermined fixed recording areas; it then transmits a notification or warning signal via output port 138b to driver circuit 28 for a predetermined period. Speaker 27 thereby produces a warning sound during this time period (step 209). CPU 130 then clears its timer (step 215) and returns to again execute the operation of step 101. However, if the results of executions at steps 204 and 206 are "NO", a determination is made whether the timer's time has elapsed (step 210). If the result of this execution is NO, the program is returned to step 204; if the result is "YES", the timer is cleared (step 215) and the program returns to step 101.

Figure 6:
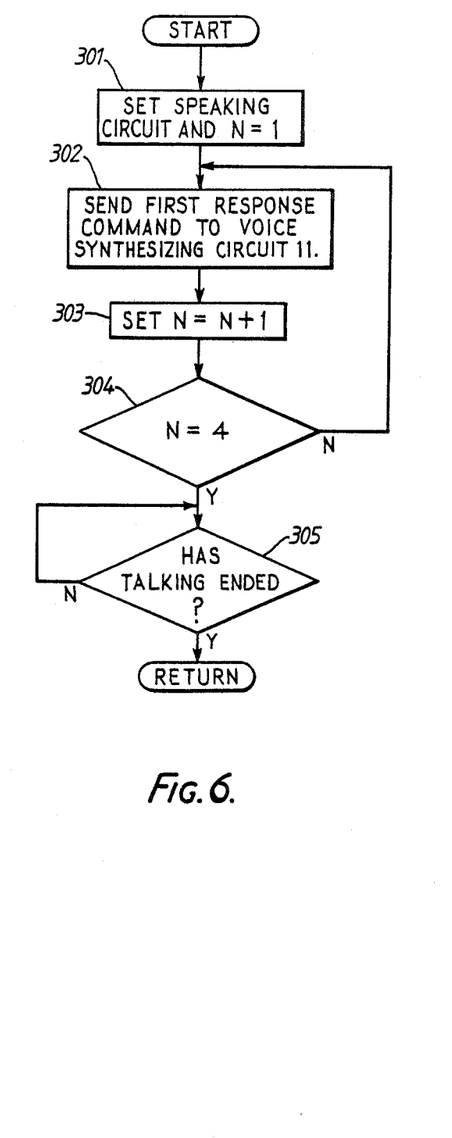

The absent mode 1 program at step 110 will be discussed below with reference to FIG. 6. In response to a paging signal (i.e., a call receipt signal) received at the remote unit from base station 2, a liaison telephone number (i.e., another number where the absent party can be reached) is sent back with voice message if the flag of absent mode 1 is "1". When a paging signal SA is received through the telephone network control circuit 17, CPU 130 sends a control signal SB to control circuit 17 to establish a speaking path to the caller's telephone; in addition, a condition N=1 is set (step 301). CPU 130 turns ON switch 14 via output port 136a and sends a first response message command to voice synthesizing circuit 11 via output port 135 (step 302). CPU 130 then reads out the telephone number of the remote unit and the liaison telephone number. These numbers, previously stored in RAM 140 by the operation of ten key unit 11, are then forwarded by the CPU to voice synthesizing circuit 11 via output port 135.

In response to the first response message command, voice synthesizing circuit 11 reads out from voice synthesizing memory 12 the message information of the first response message. Circuit 11 synthesizes a first message voice signal by combining the message information, remote unit's telephone number and the liaison telephone number. For example, the contents of the voice signal may be "This is xxxx (remote's telephone number), he is now absent", and "if urgent, please call xxxx (the liaison telephone number)". This voice signal is supplied in parallel to the output side of transmitter 15 via amplifier 13 and switch 14. As a consequence, the first response message is sent back to the calling originator through the transmission medium, including telephone lines. Upon completion of the transmission of the first response message (at step 303), a condition N=N+1 is set. A determination is then made whether N=4 (step 304). If N does not equal 4, the program is returned to step 302 to repeat the transmission of the first response message. The transmission of the first response message is repeated 3 times, that is until N=4. Thereafter, at the end of transmission (step 305), the program is returned to the initial state.

Figure 7:
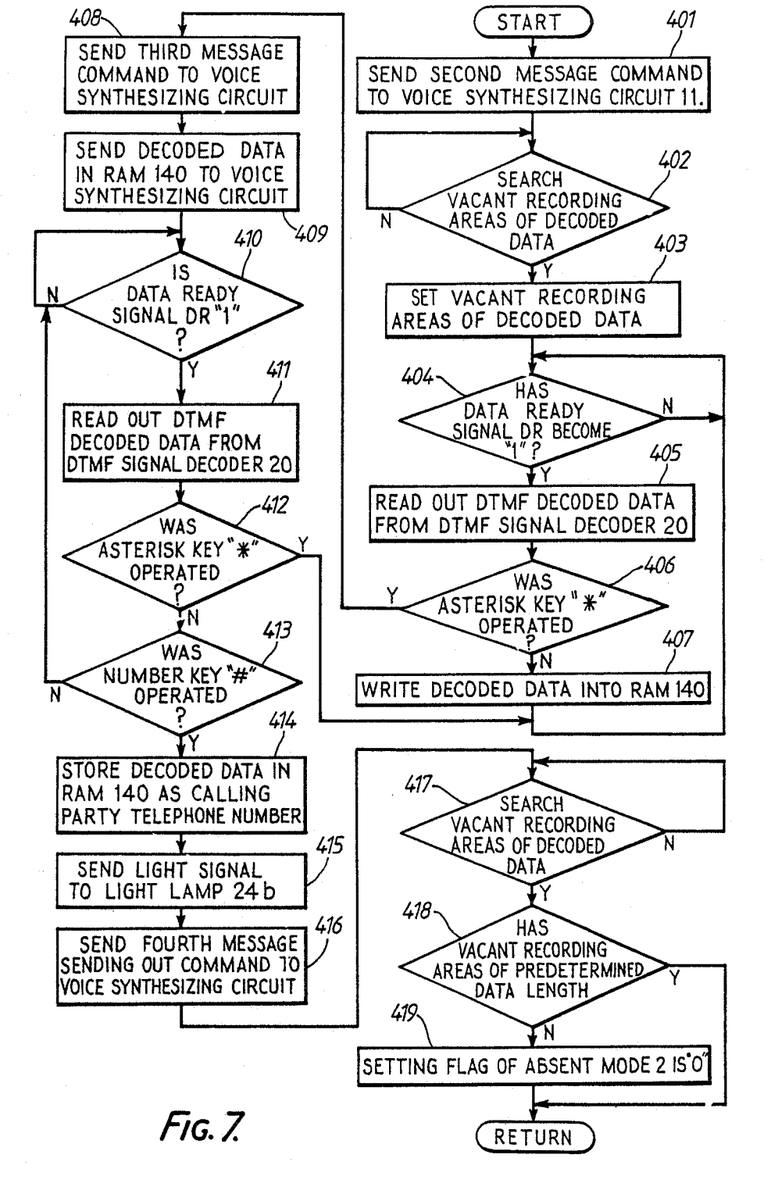

The absent mode 2 program at step 112 will be discussed below with reference to FIG. 7. A mode described below is selected if the flag of absent mode 2 is "1". In this state, when paging signal SA is received through the telephone network control circuit 17, CPU 130 supplies a control signal SB to the telephone network control circuit 17 to establish a speaking path with the calling originator. In addition, CPU 130 turns ON switch 14 via output port 136a and sends a second response message command to voice synthesizing circuit 11 via output port 135 (step 401). Furthermore, by operating a key of ten key unit 21 the remote unit's telephone number, stored in RAM 140, is read out and supplied to a voice synthesizing circuit 11 via output port 135. In response to the command, synthesizing circuit 11 reads out from voice synthesizing memory 12 the message information of the second response message and combines this information with the remote's telephone number. The synthesized voice signal and the telephone number is supplied in parallel to the output side of the transmitter 15 via amplifier 13 and switch 14. The second response message may be the following: "This is XXXX (remote's telephone number). Since the person called is now absent, please input your telephone number by depressing a dial button. After completing the input operation, please depress an asterisk key." Accordingly, the second response signal is sent to the calling originator via the speaking path.

CPU 130 searches a predetermined area in RAM 140 to store decoded data to be received and detects any vacant areas within the predetermined area (step 402). CPU 130 then sets the vacant areas for storing a predetermined length of the decoded data (step 403). During this time, the remote unit is waiting for a message from the calling party. When the calling originator depresses the button corresponding to his own telephone number, a resulting DTMF signal is supplied to amplifier 19 via the radio speaking path. This DTMF signal is decoded, digit after digit, by the DTMF signal decoder 20; the decoded signal is then supplied to input port 132 of CPU system 23. Decoder 20 is designed to send out a data ready signal DR having the value "1" each time the decoding operation is completed; accordingly CPU 130 supervises input port 132 to determine whether the data ready signal DR has become "1" (step 404).

If decoding of the first order digit of the telephone number is completed, data ready signal DR is outputted from decoder 20. The first order digit supplied from decoder 20 is written into RAM 140 via input port 132 (step 405). A determination is made whether the digit written at this time corresponds to the asterisk key (step 406). If the result of step 406 is NO, the digit written at this time is stored in RAM 140 as the first digit of the caller's telephone number (step 407). Thereafter, for the purpose of writing the second and following digits the supervision of the data ready signal is resumed. When the second digit is decoded, this digit is stored in RAM 140 in the same manner as previously described. In this manner, the processings of steps 404–407 are repeatedly executed for storing in RAM 140 all digits of the caller's telephone number.

After the calling originator depresses his asterisk key and the decoded information representing this key is stored by decoder 20, the system permits the calling party to confirm its telephone number. That is, CPU 130 sends a third response message command to voice synthesizing circuit 11 (step 408) and transfers the caller's telephone number information stored in the RAM 140 to voice synthesizing circuit 11 (step 409). Voice synthesizing circuit 11 then reads the information of the third response message from voice synthesizing memory 12 in combination with the calling party's telephone number for synthesizing a voice signal. Such a signal may be: "the telephone number inputted by you is xxxxxxx (i.e., the telephone number written into RAM 140. If correct, please depress the number key. If not, please depress the asterick key and again input the telephone number." This signal is supplied to the output side of transmitter 15 for transmission to the calling party. In this manner, the third response message in the form of voice, is transmitted to the calling party. If the caller's stored telephone number is correct, the calling party depresses its number key (#). If the number is not correct, the calling party depresses the asterisk key (*) and again sends the information to the called party as a DTMF signal.

During this time (step 410), the CPU 130 is supervising whether the data ready signal DR has become "1" after sending out the third response signal. If "YES", the code information of the number key or the asterisk key sent as the DTMF signal is written into RAM 140 (step 411). A determination is then made whether the written information corresponds to a number key as an asterisk (steps 412, 413). If a number key (step 414), the caller's telephone number which was previously stored in RAM 140 is correctly confirmed and this number is again stored. Then, a signal is sent out through output port 137 to light lamp 24b and thereby informs the called party that the caller's telephone number has been stored in RAM 140 (step 415).

Thereafter, CPU 130 sends a fourth message command to voice synthesizing circuit 11. Voice synthesizing circuit 11 reads the stored voice information corresponding to fourth response from voice synthesizing memory 12 to synthesize a voice signal. This message may be: "The telephone number inputted by you was stored. Thank You". This voice signal is supplied to the radio speaking path between the caller's telephone and the receiver telephone via switch 14. Consequently a voice communicated fourth response message is transmitted to the caller's telephone.

CPU 130 searches a predetermined area in RAM 140 to store decoded data and again detects any vacant areas within the predetermined area (step 417). CPU 130 detects a record number corresponding to the predetermined length of decoded data to be stored in the vacant recording areas. If CPU 130 determines that the record number is zero, the CPU 130 sets "0" on the state of the setting flag of absent mode 2 (step 419).

Thereafter, when the end of the voice transmission is determined the program is returned to the initial state. Then, if CPU 130 determines the record number is zero, CPU 130 sets "0" as the state of the setting flag of absent mode 2 and "1" as the state of the setting flag of absent mode 1.

In the case where the caller's stored telephone number is not correct thereby requiring the calling originator to send the asterisk key information, CPU 130 returns to the state immediately following the transmission of the second response message for the purpose of again receiving the caller's telephone number. In other words, the program is returned to step 404 for supervising the data read signal DR. In either the absent mode 1 program or the absent mode 2 program, when the speaking path is opened by hook-off of the calling party, the program is returned to the initial state by determining that the voice transmission has ended.

Figure 8:
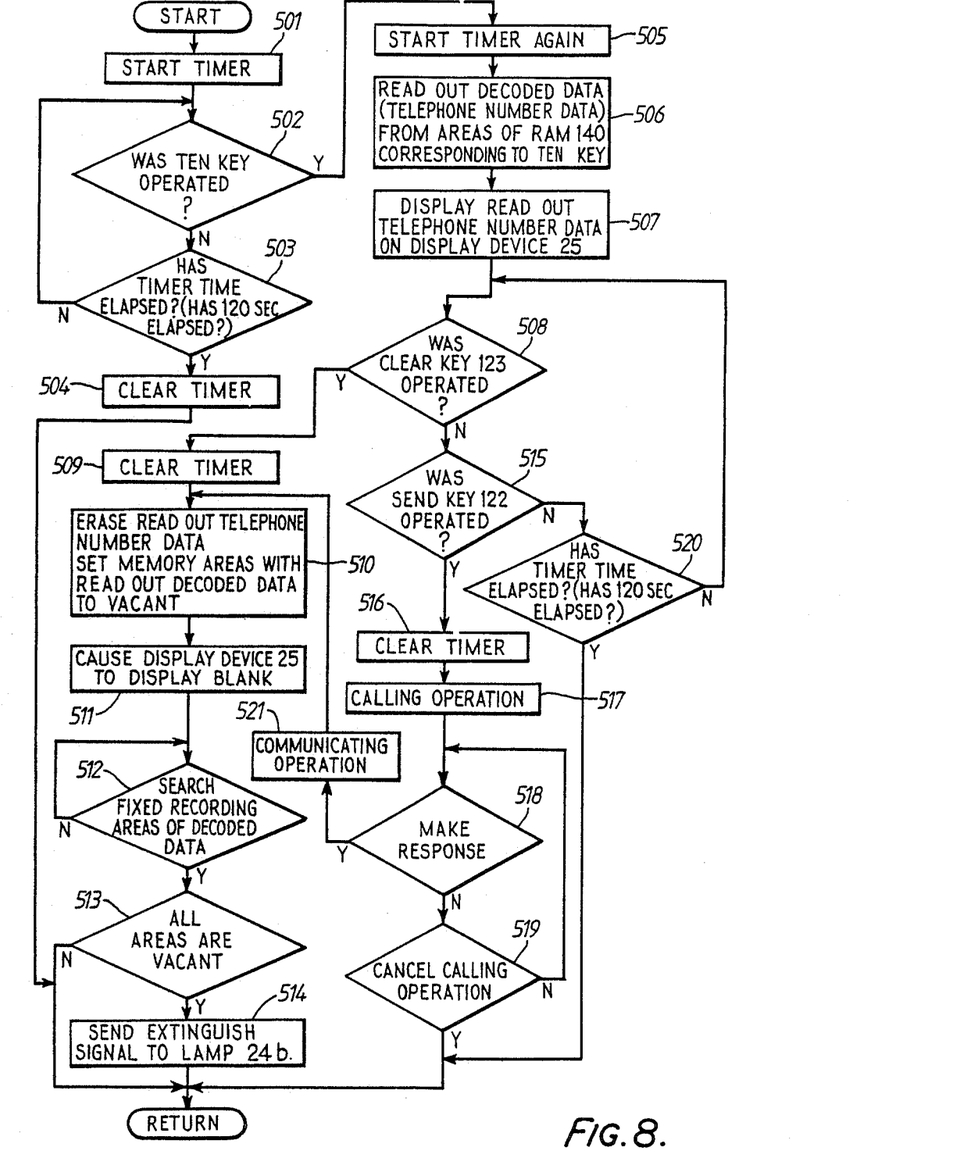

The regeneration program at step 104 will be discussed below with reference to FIG. 8. At first, a timer (not shown) is started, and a determination is made whether a key has been operated (step 501). If the result of step 502 is "NO", a determination will be made at step 503, whether the timer's time has elapsed. If the result of this determination is "NO", the program will return to step 502; if result of this determination is "YES", the timer is cleared (step 504) and the program returns to the initial state. When the result at step 502 is "YES", the timer is started again. The telephone number data, corresponding to the operated ten keys, stored in RAM 140, are read (step 506). The read telephone number data are transmitted to interface circuit 26 through output port 138a and are displayed on display device 25 (step 507).

Next, a determination is made whether the clear key 123 was operated (step 508); if "YES", the timer is cleared (step 509). The telephone number data read from RAM 140 and displayed are then erased, thus causing display device 25 to display a blank (steps 510, 511). CPU 130 causes the memory areas containing the read out decoded (telephone number) data to be vacant. More particularly, while a given telephone number is being displayed on display device 25 and the clear key 123 is depressed, the memory containing the displayed data is cleared so that display device 25 displays a blank. CPU 130 then searches a predetermined fixed area in RAM 140 to store decoded data (step 512) and detects whether all of the predetermined fixed areas are vacant (step 513). If all the predetermined fixed areas are vacant, CPU 130 sends an extinguishing signal to lamp 24b, whereby lamp 24b is extinguished and the program is returned to its initial state. If all of the predetermined fixed areas aren't vacant, the program is returned to its initial state.

If the result of step 508 is "NO", a determination is made whether the send key 122 was operated (step 515). If the result is "YES", the timer is cleared (step 516) and a predetermined calling operation is made (step 517). More particularly, if the send key 122 is depressed while the given telephone number is being displayed on display device 25, a telephone call is automatically made for the party corresponding to the telephone number data displayed on display device 25. A determination is then made whether the called party responded.

If the result of this determination is YES (step 518), CPU 130 makes a communicating operation at step 521 and the program executes the steps 510–514. If CPU 130 determines the hook-off operation of the operator while the result at step 518 is "NO", the program is returned to its initial state. More particularly, if the operator lifts the receiver off the hook and the party corresponding to the telephone number data displayed on the display device 25 doesn't respond to the call, the program is returned to its initial state. In this case, the telephone number data stored in the RAM isn't cleared.

Figure 9:
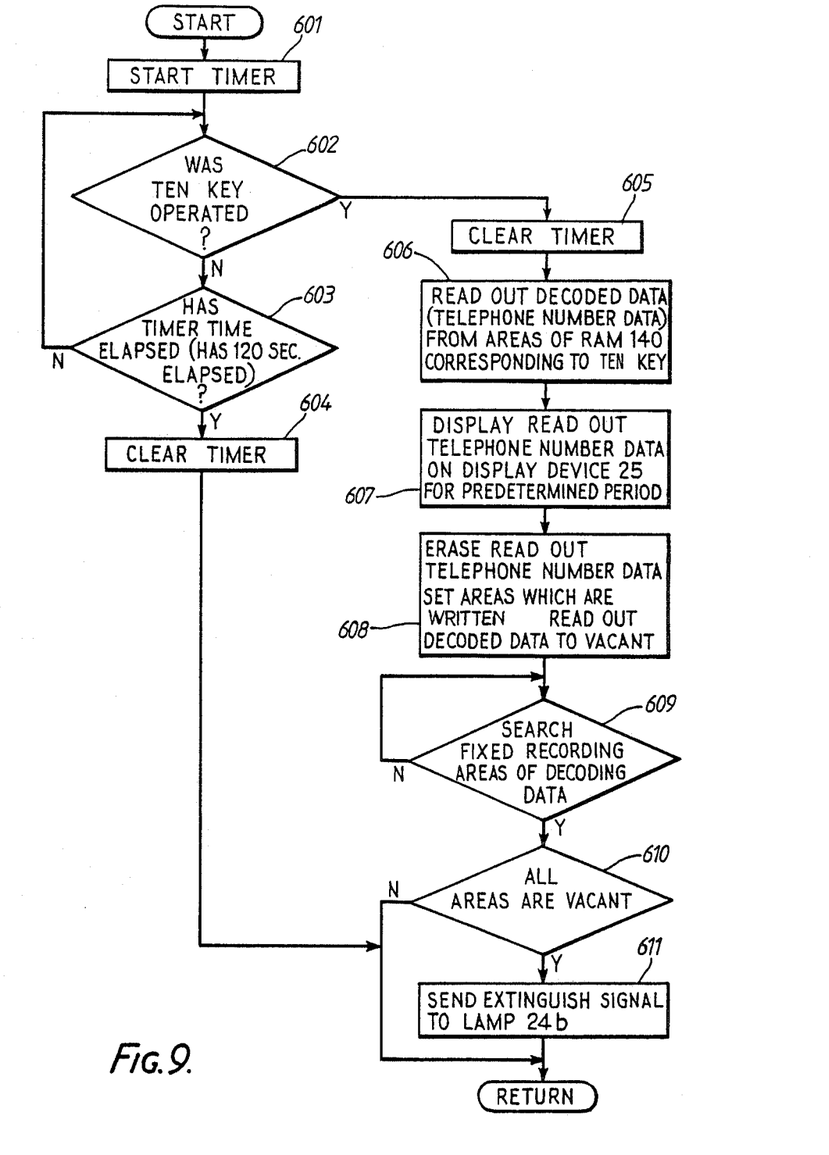

A further embodiment of the regeneration program at step 104 will be discussed with reference to FIG. 9. In this embodiment, if CPU 130 determines that the keys have been operated (step 601) while the timer's time has elapsed (step 603), the timer is cleared (step 605) and the telephone number data stored in RAM 140 are read out (step 606). The read telephone number data are displayed on the display device 25 for a predetermined period of time and the telephone number data is erased. CPU 130 sets to vacant the data areas which are read (step 608). CPU 130 then searches a predetermined fixed areas in RAM 140 to store decoded data (step 609) and detects whether all of the predetermined fixed areas are vacant (step 610). If all of these areas are vacant, CPU 130 sends an extinguishing signal to lamp 24b and the program is returned to its initial state (step 611). If the result at step 610 is "NO", the program is returned to its initial state. More particularly, when the keys are depressed, the memory storing the displayed data is cleared automatically, independently of another key operation.

The operation of searching and erasing the decoded telephone number data in RAM 140 is described below. In this embodiment, it is assumed that the digits of the decoded data is less than or equal to 16 since a maximum digits for a telephone number is usually 16. The predetermined fixed areas in RAM 140 for storing a decoding data has a capacity to store ten separate decoded telephone numbers of 16 digits each. The areas in RAM 140 is divided into ten small areas. RAM 140 has a memory table (Example A) as follows:

| Ten Keys | Memory Table - Example A Start Address | Flag |
|---|---|---|
| 0 | 0 | 1 (start address is fixed) |
| 1 | 16 | 0 |
| 2 | 32 | 0 |
| 3 | 48 | 1 |
| . | . | . |
| . | . | . |
| 9 | 144 (end address is 159) | 0 |

The flag indicates whether the areas in RAM 140 corresponding to a key is vacant. When the flag is "1", the areas corresponding to the key isn't vacant. When the flag is "0", the areas corresponding to the key is vacant.

When CPU 130 searches vacant areas in RAM 140, it searches the flag in the memory table. CPU 130 determines whether the RAM 140 has a vacant recording area of predetermined data length depending upon the state of each flag in the table. When CPU 130 reads decoded data from RAM 140, it searches for the start address in the table. CPU 130 reads from the decoded data corresponding to the start address to the decoded data corresponding to an address that is 15 addresses away from the start address.

When CPU 130 erases decoded data in RAM 140, a flag corresponding to the depressed key is changed to "0". Thereby, the number of vacant recording areas of predetermined data length in RAM 140 is increased. When the CPU determines a record number corresponding to the number of predetermined length of decoded data stored in the vacant recording areas, it searches all flags in the table and counts the "0" state flags. Thus number of counted "0" flags is the record number.

In the above embodiment, the predetermined fixed recording areas in RAM 140 for storing decoded data is divided into ten areas. If necessary, however, the number of recording areas could be variable since some telephone numbers have less than 16 digits. For example, in this case, RAM 140 could have the memory table shown in Example B below.

| Ten Keys | Memory Table - Example B Start Address | Flag |
|---|---|---|
| 0 | 0 | 1 |
| 1 | 10 | 1 (start address variable) |
| 2 | 22 | 1 |
| 3 | 38 | 0 |
| . | . | . |
| . | . | . |
| n | (end address is 159) | o |

In this case, the CPU searches the vacant areas in RAM 140. It searches the earliest starting address corresponding to a "0" state flag. If the difference between the earliest starting address (e.g., address 36) and the end address (address 159) is more than 16, the CPU determines that the RAM has vacant recording areas.

When the CPU reads out decoded data from RAM 140, it searches the starting address corrsponding to the depressed keys; it then reads out the data from this starting address to the data of the next starting address.

If CPU 130 erases data in RAM 140, the memory table is changed. For example, if decoded data corresponding to key 1 of Example B is erased, the memory table of Example B is changed as shown in the table of Example C. Namely, the read data (i.e., data starting at 10 and ending at 21) is erased and the data remaining in memory is shifted thereby increasing the storage for loading decoded data. In this case, the telephone number (see Example B) following the erased number had 16 digits beginning at address 22 and ending at address 37. As shown in Example C, it is now shifted to a new starting address (10) and ending at address 25.

| Memory Table - Example C | | |
|---|---|---|
| Ten Keys | Start Address | Flag |
| 0 | 0 | 1 |
| 1 | 10 | 1 |
| 2 | 26 | 0 |
| . | . | . |
| . | . | . |
| n | . | 0 |

If the telephone number digits are 17 or more (i.e., maximum digits for a telephone number is 16), CPU 130 cancels the data beyond 16 digits. In this case, CPU 130 sets another flag indicating that data is present beyond 16 digits; display device 25 then displays the read data within 16 digits and another data (e.g., "*") is displayed indicating this overflow condition.

Although illustrative embodiments of the present invention have been described in detail with reference to the accompanying drawings, it is to be understood that the invention is not limited to those precise embodiments. Various changes and modifications may be effected therein by one skilled in the art without departing from the scope or spirit of the invention.

I claim:

1. In a telephone system automatically responsive to transmitted DTMF signals containing information received from a calling originator, the method of receiving and processing said signals for storing said information in a memory of the telephone system, said information comprising at least one characteristic of the calling originator, comprising the steps of:
    determining the number of vacant areas within said memory available for storing said information;
    generating and transmitting a synthesized voice message corresponding to a first predetermined response message to the calling originator to request said calling originator to transmit DTMF signals if there are vacant areas available for storage;
    receiving said transmitted DTMF signals;
    generating a synthesized voice message corresponding to said received signals;
    transmitting said synthesized voice message to said calling originator for confirmation of said DTMF signals received from said calling originator;
    displaying the number of vacant areas available for storage; and
    storing said received information in said memory if there are vacant areas available for storage, said stored information being selectively read in any order as required by a user of the telephone system; and
    automatically generating and transmitting a synthesized voice message corresponding to a second predetermined response message to said calling originator if there are no vacant areas available for storage.

2. The method of claim 1 further comprising the steps of:
    determining if no vacant storage areas are available; and
    producing a notification signal to notify a user of the receiver if no vacant areas are available for storage.

3. In a telephone system automatically responsive to transmitted DTMF signals containing information received from, and corresponding to respective calling originators, the method of receiving and processing said signals for storing said information in a memory of the telephone system, said information comprising at least one character of the calling originator, comprising the steps of:
    determining whether vacant areas are available within said memory for storing said information;
    generating and transmitting a synthesized voice message corresponding to a first predetermined response message to the calling originator to request said calling originator to transmit DTMF signals if there are vacant areas available for storage;
    receiving said transmitted DTMF signals;
    storing said information in said memory if there are vacant areas available for storage;
    automatically generating and transmitting a synthesized voice message corresponding to a second predetermined response message to said calling originator if there are not vacant areas available for storage;
    automatically dialing a number of said calling originator in accordance with the stored information selected by a user of the telephone system; and
    automatically erasing said stored information corresponding to said dialed calling originator only if said dialed calling originator responds to the call automatically dialed.

4. The method of claim 3 wherein said stored information is the telephone number of the corresponding calling originator.

5. The method of claim 4 further comprising the step of displaying said stored information selected by a user of the receiver.

6. The method of claim 5 further comprising the step of blanking the displayed information if said dialed calling originator responds to the call.

7. In a telephone system automatically responsive to transmitted DTMF signals containing information received from a calling originator, said information comprising at least one characteristic of the calling originator, said system comprising:
    memory means for storing said information, means coupled to said memory means for selectively accessing said stored information in any order by a user of the telephone system;
    means for determining the number of vacant areas within said memory means available for storing said information;
    means for generating and transmitting a synthesized voice message corresponding to a first predetermined response message to the calling originator to request said calling originator to transmit DTMF signals if there are vacant areas available for storage;
    means for receiving said DTMF transmitted signals;
    voice reply means for generating synthesized voice messages corresponding to said received signals and transmitting said voice messages to said calling originator for confirming the DTMF signals received from said calling originator;
    means for displaying the number of vacant areas available for storage; and
    means for automatically generating and transmitting a synthesized voice message corresponding to a second predetermined response message to said calling originator if there are no vacant areas available for storage.

8. The system of claim 7 wherein said determining means comprises:

means for determining if no vacant storage areas are available; and said system further comprises notifications means for producing a notification signal for notifying a user of the receiver if no vacant areas are available for storage.

9. In a telephone system automatically responsive to transmitted DTMF signals containing information received from, and corresponding to respective calling originators, said information comprising at least one characteristic of the calling originator, said system comprising:

memory means for storing said information;

means for determining whether vacant areas are available within said memory means for storing said information;

means for generating and transmitting a synthesized voice message corresponding to a first predetermined response message to the calling originator to request said calling originator to transmit DTMF signals if there are vacant areas available for storage;

means for receiving said DTMF transmitted signals;

means for automatically generating and transmitting a synthesized voice message corresponding to a second predetermined response message to said calling originator if there are no vacant areas available for storage;

means for automatically dialing a number of said calling originator in accordance with the stored information selected by a user of the telephone system; and means for automatically erasing said stored information corresponding to said dialed calling originator only if said dialed calling originator responds to the automatically dialed call.

10. The system of claim 9 wherein said stored information is the telephone number of the corresponding calling originator.

11. The system of claim 10 further comprising display means for displaying said stored information selected by said user.

12. The system of claim 11 further comprising blanking means for blanking the displayed information if said dialed calling originator responds to the automatically dialed call.

13. In a telephone system automatically responsive to transmitted DTMF signals containing information received from a calling originator, the method of receiving and processing said signals for storing said information in a memory of the system, said information comprising at least one characteristic of the calling originator, comprising the steps of:

determining the number of vacant areas within said memory available for storing said information;

generating and transmitting a synthesized voice message corresponding to a first predetermined response message to the calling originator to request said calling originator to transmit DTMF signals if there are vacant areas available for storage;

receiving said transmitted DTMF signals;

displaying the number of vacant areas available for storage;

storing said received information in said memory if there are vacant areas available for storage;

automatically generating and transmitting a synthesized voice message corresponding to a second predetermined response message to said calling originator if there are no vacant areas available for storage;

automatically dialing a number of said calling originator in accordance with the stored information selected by a user of the system; and automatically erasing said stored information corresponding to said dialed calling originator only if said dialed calling originator responds to the automatically dialed call.

14. The method of claim 13 further comprising the step of:

producing a notification signal for notifying said user if no vacant areas are available for storage.

15. In a telephohne system automatically responsive to transmitted DTMF signals containing information received from, and corresponding to respective calling originators, the method of receiving and processing said signals for storing said information in a memory of the telephone system, said information comprising at least one characteristic of the calling originator, comprising the steps of:

determining whether vacant areas are available within said memory for storing said information;

generating and transmitting a synthesized voice message corresponding to a first predetermined response message to the calling originator to request said calling originator to transmit DTMF signals if there are vacant areas available for storage;

receiving said transmitted DTMF signals;

generating a synthesized voice message corresponding to said received signals;

transmitting said synthesized voice message to said calling originator for confirming the DTMF signals received from said calling originator;

storing said information in said memory if there are vacant areas available for storage, said stored information being selectively read in any order as required by a user of the telephone system;

automatically generating and transmitting a synthesized voice message corresponding to a second predetermined response message to said calling originator if there are no vacant areas available for storage;

automatically dialing a number of said calling originator in accordance with the said stored information selected by a user of the telephone system; and automatically erasing said stored information corresponding to said dialed calling originator only if said dialed calling originator responds to the automatically dialed call.

16. The method of claim 15 wherein said stored information is the telephone number of the corresponding calling originator.

17. The method of claim 16 further comprising the step of displaying said stored information selected by said user.

18. The method of claim 17 further comprising the step of blanking the displayed information if said dialed calling originator responds to the call.

19. In a telephone system automatically responsive to transmitted DTMF signals containing information comprising at least one characteristic of the calling originator, said system comprising:

memory means for storing said information;

means for determining the number of vacant areas within the memory means available for storing said information;

means for generating and transmitting a synthesized voice message corresponding to a first predetermined response message to the calling originator to request said calling originator to transmit DTMF signals;

means for receiving said DTMF transmitted signals;

means for displaying the number of vacant areas available for storage;

means for automatically generating and transmitting a synthesized voice message corresponding to a second predetermined response message to said calling originator if there are no vacant areas available for storage;

means for automatically dialing a number of said calling originator in accordance with the stored information selected by a user of the telephone system; and means for automatically erasing said stored information corresponding to said dialed calling originator only if said dialed calling orginator responds to the call.

20. The system of claim 19 further comprising:

notification means for producing a notification signal for notifying said user if no vacant areas are available for storage.

21. In a telephone system automatically responsive to transmitted DTMF signals containing information received from, and corresponding to respective calling originators, said information comprising at least one characteristic of the calling originator, said system comprising:

storge means for storing said information, said stored information being selectively read in any order as required by a user of the telephone system;

means for determining whether there are vacant areas in said storage means available for storing information;

means for generating and transmitting a synthesized voice message corresponding to a first predetermined response message to the calling originator to request said calling originator to transmit DTMF signals if there are vacant areas available for storage;

means for receiving said transmitted DTMF signals;

voice reply means for generating synthesized voice messages corresponding to said received signals and transmitting said voice messages to said calling originator for confirming the DTMF signals received from said calling originator;

means for automatically generating and transmitting a synthesized voice message corresponding to a second predetermined response message to said calling originator if there are no vacant areas available for storage;

means for automatically dialing a number of said calling originator in accordance with the stored information selected by a user of the telephone system; and means for automatically erasing said stored information corresponding to said dialed calling originator only if said dialed calling originator responds to the automatically dialed call.

22. The system of claim 21 wherein said stored information is the telephone number of the corresponding calling originator.

23. The system of claim 22 further comprising display means for displaying said stored information selected by said user.

24. The system of claim 23 further comprising blanking means for blanking the displayed information if said dialed calling originator responds to the call.

25. The method of claims 2 or 14 further comprising the step of producing a warning sound if no vacant areas are available for storage.

26. The system of claims 8 or 20 further comprising means for producing a warning sound if no vacant areas are available for storage.

* * * * *